United States Patent
Murakami (10) Patent No.: US 11,440,473 B2
(45) Date of Patent: Sep. 13, 2022

(54) DRIVING ASSISTANCE APPARATUS

(71) Applicant: AISIN CORPORATION, Kariya (JP)

(72) Inventor: Shinichiro Murakami, Kariya (JP)

(73) Assignee: AISIN CORPORATION, Kariya (JP)

( * ) Notice: Subject to any disclaimer, the term of this patent is extended or adjusted under 35 U.S.C. 154(b) by 13 days.

(21) Appl. No.: 16/663,638

(22) Filed: Oct. 25, 2019

(65) Prior Publication Data

US 2020/0130578 A1   Apr. 30, 2020

(30) Foreign Application Priority Data

Oct. 29, 2018 (JP) .............................. JP2018-203218

(51) Int. Cl.
*G06K 9/00* (2022.01)
*B60Q 9/00* (2006.01)
(Continued)

(52) U.S. Cl.
CPC .............. *B60Q 9/00* (2013.01); *G06F 3/013* (2013.01); *G06V 10/464* (2022.01); *G06V 20/56* (2022.01);
(Continued)

(58) Field of Classification Search
CPC ...... B60Q 9/00; G06F 3/013; G06K 9/00791; G06K 9/00845; G06K 9/4676; B60R 11/04; B60R 2011/0003
(Continued)

(56) References Cited

U.S. PATENT DOCUMENTS 7,519,459 B2   4/2009 Ito et al.
8,471,691 B2 *  6/2013 Zhang .................... B60K 35/00
                                                 701/1
(Continued)

FOREIGN PATENT DOCUMENTS

JP     2005-267108 A    9/2005
JP     2007-17340 A     1/2007
(Continued)

OTHER PUBLICATIONS

Xu et al., "Beyond Universal Saliency: Personalized Saliency Prediction with Multi-task CNN", Proceedings of the Twenty-Sixth International Joint Conference on Artificial Intelligence (IJCAI-17), 2017, 7 pp. 3887-3893.

*Primary Examiner* — Kerri L McNally
*Assistant Examiner* — Thang D Tran
(74) *Attorney, Agent, or Firm* — Sughrue Mion, PLLC (57) ABSTRACT

A driving assistance apparatus includes a gaze detection portion detecting a gaze distribution of a driver for a vehicle, an image acquisition portion acquiring a captured image from an imaging device that captures an image in surroundings of the vehicle, a driver information acquisition portion acquiring driver information that allows identification of the driver for the vehicle, a generation portion generating a personalized saliency map based on the captured image and the driver information, the personalized saliency map that serves as a saliency map for the captured image and that differs depending on the driver, and a determination portion determining whether or not the driver looks at a visual confirmation target in the surroundings of the vehicle by comparing the gaze distribution detected by the gaze detection portion and the personalized saliency map generated by the generation portion.

12 Claims, 6 Drawing Sheets

(51) Int. Cl.
*G06F 3/01* (2006.01)
*G06V 10/46* (2022.01)
*G06V 20/56* (2022.01)
*G06V 20/59* (2022.01)
*B60R 11/00* (2006.01)
*B60R 11/04* (2006.01)

(52) U.S. Cl.
CPC ............ *G06V 20/597* (2022.01); *B60R 11/04* (2013.01); *B60R 2011/0003* (2013.01)

(58) Field of Classification Search
USPC ........................................................ 382/103
See application file for complete search history.

(56) References Cited

U.S. PATENT DOCUMENTS

| | | | |
|---|---|---|---|
| 9,824,294 | B2 | 11/2017 | Ruan et al. |
| 10,040,350 | B2* | 8/2018 | Dias ...................... B60W 50/14 |
| 10,379,612 | B1* | 8/2019 | Bonnier ................ G06F 3/0304 |
| 10,475,145 | B1* | 11/2019 | Lester .................... G06V 10/25 |
| 2005/0209749 | A1* | 9/2005 | Ito ............................. B60R 1/00 |
| | | | 701/36 |
| 2006/0287779 | A1* | 12/2006 | Smith .................... A61B 5/1103 |
| | | | 701/1 |
| 2007/0019038 | A1 | 1/2007 | Kubota et al. |
| 2008/0025566 | A1* | 1/2008 | Widdowson ............ G06T 11/60 |
| | | | 382/103 |
| 2008/0037803 | A1* | 2/2008 | Breed ...................... H04R 5/02 |
| | | | 381/86 |
| 2008/0219587 | A1* | 9/2008 | Avidan ................... G06T 3/0012 |
| | | | 382/276 |
| 2009/0034842 | A1* | 2/2009 | Grosvenor ........... H04N 1/3872 |
| | | | 382/173 |
| 2010/0189354 | A1* | 7/2010 | de Campos ............ G06V 10/25 |
| | | | 707/E17.071 |
| 2010/0208205 | A1* | 8/2010 | Tseng .................... G06K 9/4628 |
| | | | 351/209 |
| 2010/0226564 | A1* | 9/2010 | Marchesotti ........... G06K 9/469 |
| | | | 382/159 |
| 2010/0253594 | A1* | 10/2010 | Szczerba ................ G08G 1/165 |
| | | | 345/7 |
| 2011/0169625 | A1* | 7/2011 | James .................... G08G 1/166 |
| | | | 340/439 |
| 2011/0229025 | A1* | 9/2011 | Zhao ..................... G06K 9/4671 |
| | | | 382/165 |
| 2013/0084013 | A1* | 4/2013 | Tang .................... G06V 10/462 |
| | | | 382/195 |
| 2014/0210978 | A1* | 7/2014 | Gunaratne ............... A61B 5/18 |
| | | | 348/77 |
| 2014/0270553 | A1* | 9/2014 | Zund ..................... H04N 19/59 |
| | | | 382/233 |
| 2014/0359656 | A1* | 12/2014 | Banica ................. H04N 21/234 |
| | | | 725/32 |
| 2015/0262484 | A1* | 9/2015 | Victor .................. G09B 19/167 |
| | | | 701/1 |
| 2015/0314681 | A1* | 11/2015 | Riley, Sr. ............... G08B 21/06 |
| | | | 340/576 |
| 2015/0339589 | A1* | 11/2015 | Fisher .................... G06V 20/52 |
| | | | 706/12 |
| 2016/0209979 | A1* | 7/2016 | Endo ....................... G06F 3/016 |
| 2016/0309081 | A1* | 10/2016 | Frahm .................... G06V 40/19 |
| 2016/0318395 | A1* | 11/2016 | Cofer ..................... G08B 25/08 |
| 2016/0345907 | A1* | 12/2016 | Fung .................... G06K 9/00536 |
| 2016/0358035 | A1* | 12/2016 | Ruan .................... G06K 9/4676 |
| 2017/0083762 | A1* | 3/2017 | Segalovitz ......... G06K 9/00463 |
| 2017/0200279 | A1* | 7/2017 | Zhong ..................... G06T 7/194 |
| 2017/0206440 | A1* | 7/2017 | Schrier ................. G05D 1/021 |
| 2017/0270374 | A1* | 9/2017 | Myers ................ G06K 9/00369 |
| 2018/0046870 | A1* | 2/2018 | Cordell ................. G06K 9/00281 |
| 2018/0154905 | A1 | 6/2018 | Yoshizu |
| 2018/0165541 | A1* | 6/2018 | Amico ................. G06K 9/6212 |
| 2018/0229372 | A1* | 8/2018 | Breazeal ................ B25J 11/001 |
| 2018/0307935 | A1* | 10/2018 | Rao ..................... G06K 9/3233 |
| 2019/0094962 | A1* | 3/2019 | Fujita ..................... G06F 3/013 |
| 2019/0108752 | A1* | 4/2019 | Oe .......................... G08G 1/0129 |
| 2019/0110729 | A1* | 4/2019 | Yamataka ............ A61B 5/1495 |
| 2019/0132520 | A1* | 5/2019 | Gupta .................. H04N 5/2628 |
| 2019/0143989 | A1* | 5/2019 | Oba ...................... G06V 10/147 |
| | | | 701/70 |
| 2019/0146499 | A1* | 5/2019 | Wang .................... G05D 1/0212 |
| | | | 701/26 |
| 2019/0210642 | A1* | 7/2019 | Bender ................ B62D 15/025 |
| 2019/0317594 | A1* | 10/2019 | Stent ..................... G05D 1/0221 |
| 2020/0064912 | A1* | 2/2020 | Melatti ............... G06K 9/00791 |
| 2020/0097754 | A1* | 3/2020 | Tawari ................... G06V 20/56 |

FOREIGN PATENT DOCUMENTS

| | | |
|---|---|---|
| JP | 2007-133692 A | 5/2007 |
| JP | 2009-93341 A | 4/2009 |
| JP | 2017-4480 A | 1/2017 |
| JP | 2018-97398 A | 6/2018 |

* cited by examiner

DRIVING ASSISTANCE APPARATUS

CROSS REFERENCE TO RELATED APPLICATIONS

This application is based on and claims priority under 35 U.S.C. § 119 to Japanese Patent Application 2018-203218, filed on Oct. 29, 2018, the entire content of which is incorporated herein by reference.

TECHNICAL FIELD

This disclosure generally relates to a driving assistance apparatus.

BACKGROUND DISCUSSION

According to a known technique such as disclosed in JP2005-267108A, JP2017-4480A, and JP2009-93341A, for example, a saliency map is generated for a captured image obtained by an imaging device that captures an image of surroundings of a vehicle. The saliency map generated in the aforementioned manner is compared with a detection result of an eye-gaze distribution of a driver of the vehicle so as to determine whether or not the driver recognizes a subject that should be visually confirmed (i.e., a visual confirmation target) in the surroundings of the vehicle.

According to the aforementioned technique, the saliency map is inhibited from being generated using driver information based on which each driver is identifiable. It is thus impossible to generate the saliency map for each of different drivers, which may decrease determination accuracy of whether or not the driver recognizes a subject that should be visually confirmed in the surroundings of the vehicle.

A need thus exists for a driving assistance apparatus which is not susceptible to the drawback mentioned above.

SUMMARY

According to an aspect of this disclosure, a driving assistance apparatus includes a gaze detection portion detecting a gaze distribution of a driver for a vehicle, an image acquisition portion acquiring a captured image from an imaging device that captures an image in surroundings of the vehicle, a driver information acquisition portion acquiring driver information that allows identification of the driver for the vehicle, a generation portion generating a personalized saliency map based on the captured image and the driver information, the personalized saliency map that serves as a saliency map for the captured image and that differs depending on the driver, and a determination portion determining whether or not the driver looks at a visual confirmation target in the surroundings of the vehicle by comparing the gaze distribution detected by the gaze detection portion and the personalized saliency map generated by the generation portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments disclosed here are explained with reference to the attached drawings. Configurations of the embodiments described below, and operations, results, and effects brought about by such configurations are examples. The embodiments are achievable by other configurations than the following configurations and at least one of various effects based on the basic configuration and derived effects may be obtained.

A vehicle at which a driving assistance apparatus according to the embodiments is mounted may be an automobile including an internal combustion engine (engine) as a driving source (i.e., an internal combustion engine automobile), an automobile including an electric motor (motor) as a driving source (i.e., an electric automobile and a fuel cell automobile, for example), or an automobile including both the engine and the motor as a driving source (i.e., a hybrid automobile), for example. The vehicle may include any types of transmission devices and any types of devices including systems and components, for example, for driving the internal combustion engine or the electric motor. A system, the number, and a layout, for example, of a device related to driving of wheels of the vehicle may be appropriately employed or specified.

Figure 1:
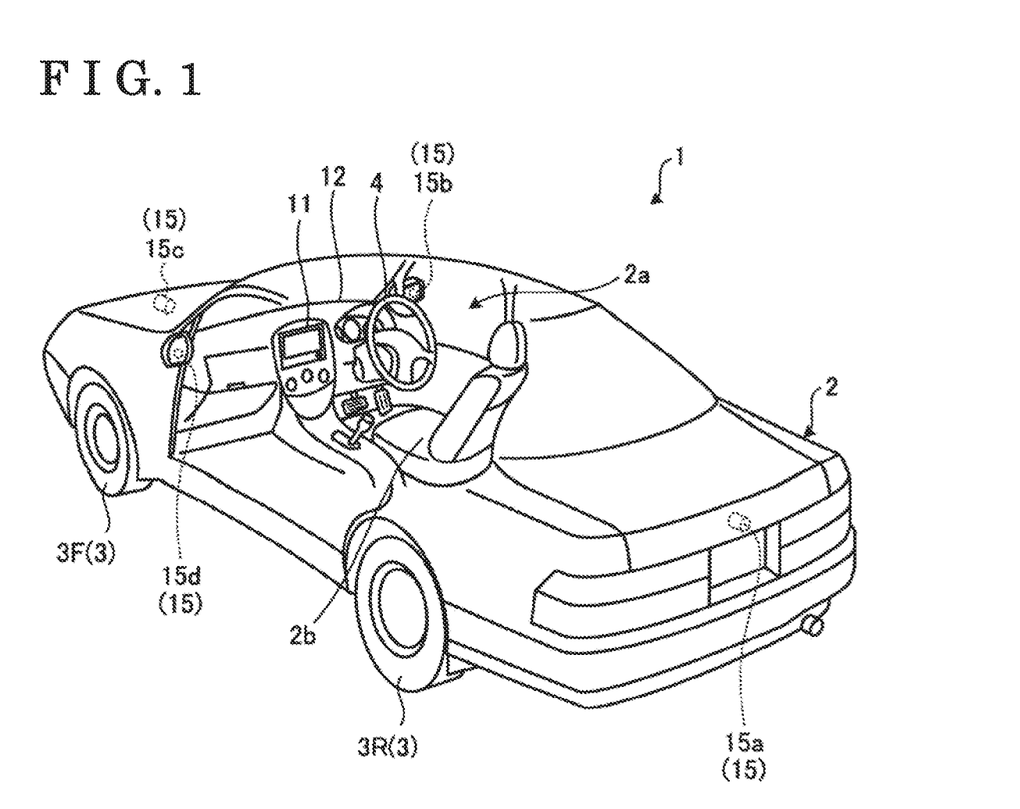
FIG. 1 is a perspective view illustrating a vehicle of which an interior is partially looked through, the vehicle at which a driving assistance apparatus according to a first embodiment is mounted.

A first embodiment is explained with reference to FIGS. 1 and 2. As illustrated in FIG. 1, a vehicle 1 includes a vehicle body 2, a steering portion 4, and a monitor device 11.

The vehicle body 2 includes a vehicle interior 2a where a driver is in. The steering portion 4, for example, is provided within the vehicle interior 2a so as to be opposed to a seat 2b for a driver serving as a passenger. The steering portion 4 is a steering wheel (a steering handle) protruding from a dashboard (an instrument panel) 12, for example.

The monitor device 11 is provided at a substantially center of the dashboard 12 in a vehicle width direction, i.e., in a right and left direction, thereof. The monitor device 11 includes a display device 8 (see FIG. 3) and an audio output device 9 (see FIG. 3). The display device 8 is a liquid crystal display (LCD) or an organic electroluminescent display (OELD), for example. The audio output device 9 is a speaker, for example. The display device 8 is covered with an operation input portion 10 (see FIG. 3) that is transparent such as a touch panel, for example.

Figure 3:
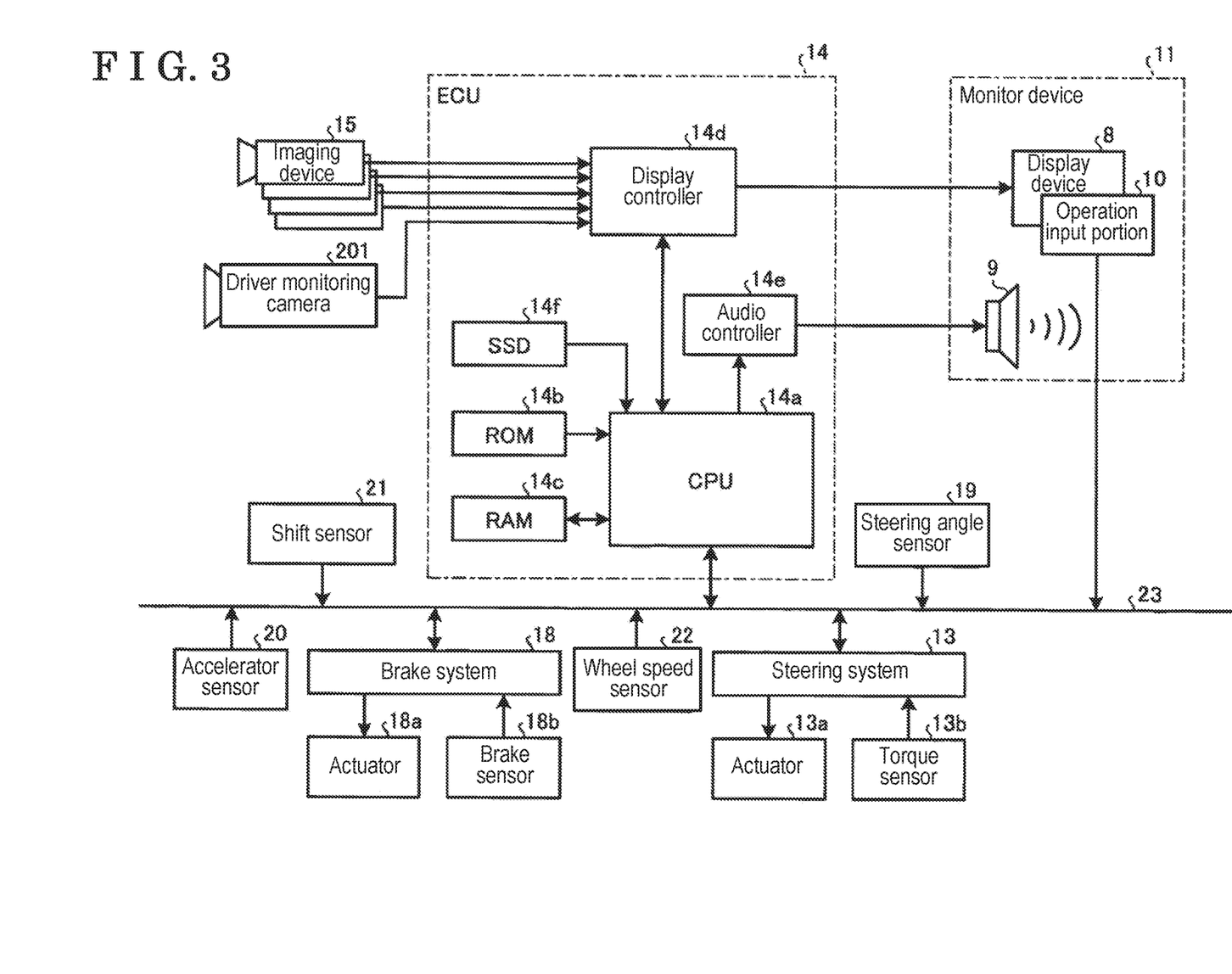
FIG. 3 is a block diagram of a functional configuration of the vehicle according to the first embodiment.

A passenger of the vehicle 1 may visually confirm an image displayed at a display screen of the display device 8 via the operation input portion 10. The passenger may visually confirm the image displayed at the display screen of the display device 8 via the operation input portion 10. The passenger may perform an operation input by touching, pressing down, or moving the operation input portion 10 with one's finger, for example, at a position corresponding to the image displayed at the display screen of the display device 8.

Figure 2:
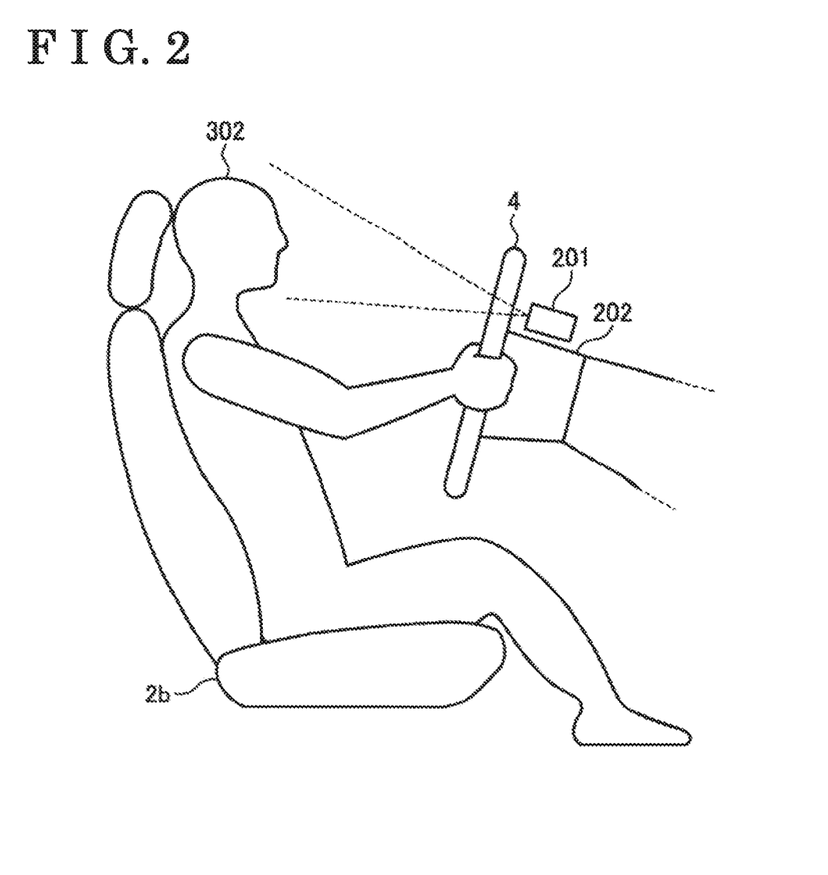
FIG. 2 is a diagram illustrating an arrangement of a driver monitoring camera at the vehicle according to the first embodiment.

As illustrated in FIG. 2, a driver monitoring camera 201 is mounted at a handle column 202. The driver monitoring camera 201 is constituted by a charge coupled device (CCD), for example. A view angle and a position of the driver monitoring camera 201 are adjusted so that the face of a driver 302 seated on the seat 2b is positioned at a center of a field of vision of the camera 201. The driver monitoring camera 201 sequentially captures an image of the face of the driver 302 and sequentially outputs image data of such captured image.

As illustrated in FIG. 1, the vehicle 1 is a four-wheel automobile, for example, while including right and left front wheels 3F and right and left rear wheels 3R. All of the aforementioned four wheels 3 (3F and 3R) are steerable.

As illustrated in FIG. 1, the vehicle 1 is equipped with plural imaging devices 15 (onboard cameras). In the present embodiment, the vehicle 1 includes four imaging devices 15a to 15d, for example. Each of the imaging devices 15 is a digital camera incorporating an imaging element such as a charge coupled device (CCD) and a CMOS image sensor (CIS), for example. The imaging device 15 may capture an image of surroundings of the vehicle 1 at a predetermined frame rate. The imaging device 15 outputs a captured image obtained by capturing the image of the surroundings of the vehicle 1. The imaging device 15 has a wide-angle lens or a fisheye lens and may photograph a range of, for example, 140° to 220° in a horizontal direction. An optical axis of the imaging device 15 may be possibly set obliquely downward.

Specifically, the imaging device 15a is positioned at a rear end portion of the vehicle body 2 and is provided at a wall portion below a trunk lid, for example. The imaging device 15a may capture an image of a rear region of the vehicle 1 among the surroundings of the vehicle 1. The imaging device 15b is positioned at a right side of the vehicle body 2, i.e., at a right-end portion in the vehicle width direction and is provided at a right-side door mirror, for example. The imaging device 15b may capture an image of a lateral region of the vehicle 1 among the surroundings of the vehicle 1. The imaging device 15c is positioned at a front side of the vehicle body 2, i.e., at a front end portion of the vehicle 1 in a front-rear direction and is provided at a front bumper or a front grill, for example. The imaging device 15c may capture an image of a front region of the vehicle 1 among the surroundings of the vehicle 1. The imaging device 15d is positioned at a left side of the vehicle body 2, i.e., at a left-end portion in the vehicle width direction and is provided at a left-side door mirror, for example. The imaging device 15d may capture an image of a lateral region of the vehicle 1 among the surroundings of the vehicle 1.

Next, a functional configuration of the vehicle 1 according to the present embodiment is explained with reference to FIG. 3. As illustrated in FIG. 3, the vehicle 1 includes an electronic control unit (ECU) 14, the monitor device 11, a steering system 13, a brake system 18, a steering angle sensor 19, an accelerator sensor 20, a shift sensor 21, and a wheel speed sensor 22, for example, which are electrically connected to one another via an in-vehicle network 23 serving as an electrical communication line. The in-vehicle network 23 is configured as a controller area network (CAN), for example.

The steering system 13 is an electric power steering system or a steer by wire (SBW) system, for example. The steering system 13 includes an actuator 13a and a torque sensor 13b. The steering system 13 that is electrically controlled by the ECU 14, for example, operates the actuator 13a so that a torque is applied to the steering portion 4 as supplemental steering force. The steering portion 4 steers the wheels 3 accordingly. The torque sensor 13b detects a torque applied to the steering portion 4 by the driver and transmits a detection result to the ECU 14.

The brake system 18 includes an anti-lock brake system (ABS) restraining the wheels of the vehicle 1 from locking during braking, an electronic stability control (ESC) restraining skidding of the vehicle 1 upon cornering thereof, an electric (power) brake system performing a braking assist by enhancing a braking force, and a brake by wire (BBW). The brake system 18 includes an actuator 18a and a brake sensor 18b, for example. The brake system 18 is electrically controlled by the ECU 14, for example, so as to apply a braking force to each of the wheels 3 via the actuator 18a. The brake system 18 may perform a control for restraining the wheels of the vehicle 1 from locking during braking, free spin of the wheels 3, and skidding by detecting a sign of locking of the wheels, free spin of the wheels 3, and skidding of the vehicle 1 based on difference in rotations between the right and left wheels 3, for example. The brake sensor 18b is a displacement sensor detecting a position of the brake pedal serving as a movable part of a braking operation portion. The brake sensor 18b transmits a detection result of the position of the brake pedal to the ECU 14.

The steering angle sensor 19 detects a steering amount of the steering portion 4 such as a steering wheel, for example. In the embodiment, the steering angle sensor 19, which is configured with a Hall element, for example, detects a rotation angle of a rotary part of the steering portion 4 as the steering amount and transmits a detection result to the ECU 14. The accelerator sensor 20 is a displacement sensor detecting a position of the accelerator pedal serving as a movable part of an accelerating operation portion. The accelerator sensor 20 transmits a detection result to the ECU 14.

The shift sensor 21 detects a position of a movable part of a gear change operation portion (for example, a bar, an arm, and a button) and transmits a detection result to the ECU 14. The wheel speed sensor 22 including a Hall element, for example, detects an amount of rotations of the wheel 3 and the number of rotations (a rotation speed) thereof per time unit and transmits a detection result to the ECU 14.

The ECU 14 that is constituted by a computer, for example, entirely controls the vehicle 1 in a state where hardware and software operate in cooperation with each other. Specifically, the ECU 14 includes a central processing unit (CPU) 14a, a read only memory (ROM) 14b, a random access memory (RAM) 14c, a display controller 14d, an audio controller 14e, and a solid state drive (SSD) (flash memory) 14f. The CPU 14a entirely controls the vehicle 1. The CPU 14a reads out program installed and stored at a non-volatile storage unit such as the ROM 14b, for example, and performs an arithmetic processing based on such program.

The ROM 14b stores various programs and parameters for executing such programs, for example. The RAM 14c tentatively stores various data used for calculation at the CPU 14a. The display controller 14d mainly performs an image processing with image data acquired by each imaging device 15 that captures an image in the surroundings of the vehicle 1 and synthesis of image data displayed at the display device 8 among the arithmetic processing performed at the ECU 14. The audio controller 14e mainly performs a processing of audio data output from the audio output device 9 among the arithmetic processing performed at the ECU 14. The SSD 14f that is a rewritable non-volatile storage unit is configured to store data even when a power source of the ECU 14 is turned off.

The CPU 14a, the ROM 14b, and the RAM 14c, for example, may be integrated within the same package. The ECU 14 may be constructed to use another arithmetic logic processor or logic circuit such as a digital signal processor (DSP), for example, instead of the CPU 14a. In addition, a hard disk drive (HDD) may be provided instead of the SSD 14f, or the SSD 14f and the HDD may be provided separately from the ECU 14, for example. The configurations, arrangements, and electric connections of the aforementioned sensors and actuators, for example, are examples and may be appropriately specified or changed.

Figure 4:
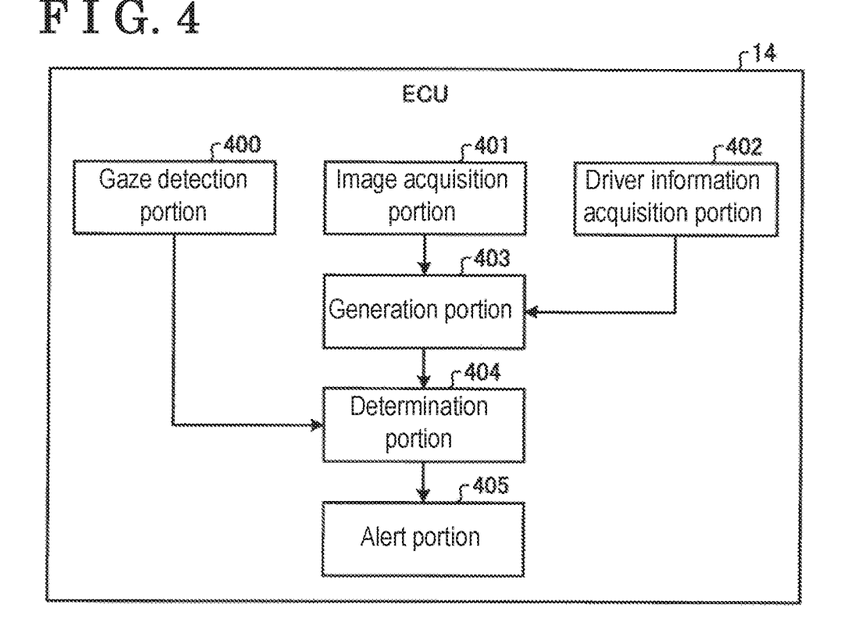
FIG. 4 is a block diagram of a functional configuration of an ECU provided at the vehicle according to the first embodiment.

Next, a functional configuration of the ECU 14 provided at the vehicle 1 according to the present embodiment is explained with reference to FIG. 4. As illustrated in FIG. 4, the ECU 14 mainly includes a gaze detection portion 400, an image acquisition portion 401, a driver information acquisition portion 402, a generation portion 403, a determination portion 404, and an alert portion 405. The gaze detection portion 400, the image acquisition portion 401, the driver information acquisition portion 402, the generation portion 403, the determination portion 404, and the alert portion 405 are achieved by the CPU 14a of the ECU 14 executing the program stored at the ROM 14b. Alternatively, the aforementioned configurations may be achieved by hardware.

The gaze detection portion 400 detects an eye-gaze distribution (gaze distribution) of the driver 302 of the vehicle 1. In the present embodiment, the gaze detection portion 400 detects an image of the face and/or the eye(s) of the driver 302 based on a captured image obtained by the driver monitoring camera 201 that captures the image of the driver 302. The gaze detection portion 400 detects the gaze distribution of the driver 302 based on the detected image of the face and/or the eyes of the driver 302.

The image acquisition portion 401 functions as an acquisition portion acquiring a captured image from the imaging device 15 that captures an image in a travelling direction of the vehicle 1. In the present embodiment, the image acquisition portion 401 acquires the captured image obtained by the imaging device 15. Alternatively, the image acquisition portion 401 may acquire an image representing a measurement result of a distance between the vehicle 1 and an object in the surroundings of the vehicle 1 measured by a light detection and ranging (LIDAR), a time of flight (TOF) camera, a millimeter-wave radar, or an ultrasonic sensor, for example, as a captured image.

The driver information acquisition portion 402 functions as an acquisition portion that acquires information of the driver 302 of the vehicle 1 (i.e., driver information). The driver information serves as information that allows identification of the driver 302, such as a subject number serving as a number assigned to the driver 302, a driving experience of the driver 302, and the gender of the driver 302, for example. In the present embodiment, the driver information acquisition portion 402 acquires the driver information input by the driver 302 via the operation input portion 10. In the present embodiment, the driver information acquisition portion 402 acquires vehicle information in addition to the driver information. The vehicle information serves as information indicating a driving state of the vehicle 1, such as a steering amount of the steering portion 4 detected by the steering angle sensor 19 and a speed of the vehicle 1 based on the number of rotations (rotation speed) of the wheel 3 detected by the wheel speed sensor 22, for example.

The generation portion 403 generates a personalized saliency map based on the captured image acquired by the image acquisition portion 401, the driver information, and the vehicle information acquired by the driver information acquisition portion 402. The personalized saliency map serves as a saliency map for the captured image and also serves as a saliency map which differs or varies depending on the driver 302. That is, saliency maps which may be different from one another are generated for respective drivers to serve as personalized saliency maps.

Because the personalized saliency map which differs or varies depending on the driver 302 is generated, accuracy of determining whether or not the driver 302 recognizes danger in the surroundings of the vehicle 1 may improve by a comparison between the personalized saliency map for the driver 302 and the gaze distribution detected by the gaze detection portion 400. In the present embodiment, the generation portion 403 generates a generative model based on the captured image, the driver information, and the vehicle information. The generation portion 403 may generate a generative model based on at least the captured image and the driver information.

In a case where the saliency map is calculated for each subject (in the present embodiment, each driver 302), calculation of the saliency map differs depending on the subject (the driver 302). In order to generate the saliency map for each subject, a submodule dedicated to each subject is necessarily generated. Nevertheless, because countless subjects as drivers may be considered, it may be difficult to generate a submodule for each subject (each driver 302) in view of an application mounted at the vehicle 1.

Consequently, according to the present embodiment, the generation portion 403 learns, by means of a generative deep neural network, a generative model (i.e., conditional variational auto encoder (CVAE) and conditional generative adversarial nets (CGAN), for example) serving as a single model configured to generate a personalized saliency map for each different driver 302 based on the captured image, the driver information, and the vehicle information.

The generation portion 403 generates the personalized saliency map for the driver 302 of which gaze distribution is detected by the gaze detection portion 400, using the generative model which the generation portion 403 has learnt. A submodule dedicated to each driver 302 is thus not required and the personalized saliency map for each different driver (each driver 302) may be generated at the vehicle 1.

Alternatively, the generation portion 403 may learn, by means of a deep neural network (a generative deep neural network or a recognition deep neural network), a model that is configured to generate a global saliency map serving as a saliency map that is inhibited from depending on each different driver 302, based on the captured image, the driver information, and the vehicle information. The generation portion 403 may then learn, by means of a generative deep neural network, a generative model that is configured to generate a personalized saliency map serving as a difference between the global saliency map and a saliency map based on the captured image.

The generation portion 403 learns a model that is configured to generate a highly accurate global saliency map using data of all drivers 302 and learns a generative model that is configured to generate a personalized saliency map serving as a difference between a global saliency map generated by the aforementioned model and a saliency map based on the captured image. The personalized saliency map is thus accurately generated with a reduced calculation means.

The determination portion 404 compares the gaze distribution detected by the gaze detection portion 400 and the personalized saliency map generated by the generation portion 403 to determine whether or not the driver 302 looks or gazes at a subject (object) in the surroundings of the vehicle 1 that should be visually confirmed (i.e., a visual confirmation target such as an oncoming vehicle, a signal, an advertisement, a side road, and someone running out into the road, for example). Because whether or not the driver 302 looks or gazes at the object that should be confirmed in the surroundings of the vehicle 1 is determinable by means of the personalized saliency map generated for each different driver 302, accuracy of such determination may improve.

In the present embodiment, the determination portion 404 determines that the driver 302 fails to look at the object that should be visually confirmed in the surroundings of the vehicle 1 in a case where a difference between the gaze distribution detected by the gaze detection portion 400 and the personalized saliency map generated for the driver 302 by the generation portion 403 is equal to or greater than a predetermined threshold value. On the other hand, in a case where the difference between the detected gaze distribution and the generated personalized saliency map is smaller than the aforementioned predetermined threshold value, the determination portion 404 determines that the driver 302 looks at the object that should be visually confirmed in the surroundings of the vehicle 1.

The alert portion 405 alerts the driver 302, for example, to danger in a case where the difference between the gaze distribution detected by the gaze detection portion 400 and the personalized saliency map generated by the generation portion 403 is equal to or greater than the predetermined threshold value. The driver 302 of the vehicle 1 may easily recognize that he/she fails to look at the object that should be visually confirmed in the surroundings of the vehicle.

The alert portion 405 alerts the driver 302 that the driver 302 fails to look at the object that should be visually confirmed in the surroundings of the vehicle 1. In the present embodiment, the alert portion 405 alerts the driver 302 by displaying an image or a message indicating that the driver 302 fails to look at the object that should be visually confirmed in the surroundings of the vehicle 1 at the display device 8 or by outputting a sound indicating that the driver 302 fails to look at the object that should be visually confirmed in the surroundings of the vehicle 1 from the audio output device 9.

An example of generating a personalized saliency map at the vehicle 1 according to the present embodiment is explained with reference to FIG. 5.

Figure 5:
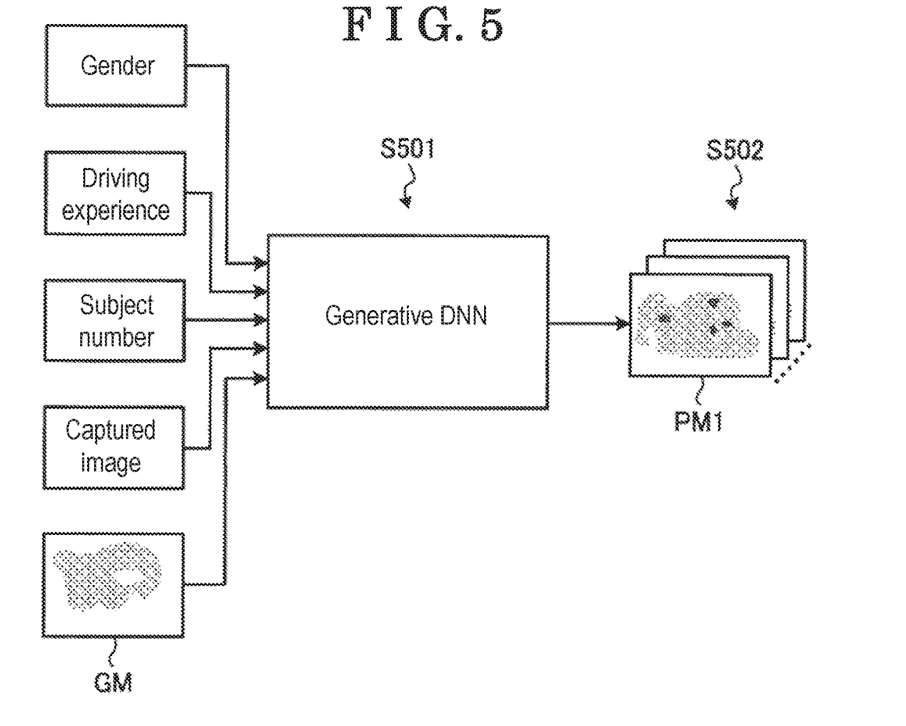
FIG. 5 is a diagram explaining a processing of generating a personalized saliency map at the vehicle according to the first embodiment.

For example, as illustrated in FIG. 5, the generation portion 403 learns a generative model that is configured to generate a personalized saliency map PM1 for each different driver 302 by a generative deep neural network with inputs of a captured image obtained by the image acquisition portion 401, gender, driving experience, subject number, and a global saliency map GM (step S501). The generation portion 403 generates and outputs the personalized saliency map PM1 for the driver 302 of which gaze distribution is detected by the gaze detection portion 400, by means of the generative model that the generation portion 403 has learnt (step S502).

The personalized saliency map for each different driver 302 is generated at the vehicle 1 according to the first embodiment. Whether or not the driver 302 recognizes danger in the surroundings of the vehicle 1 is thus accurately determined by the comparison between the personalized saliency map and the gaze distribution detected by the gaze detection portion 400.

A second embodiment is explained below. According to the second embodiment, driver information including driving skill of a driver is acquired. Personalized saliency maps for different driving skills are generated on a basis of captured image and driver information. The detected gaze distribution of each driver and the aforementioned personalized saliency maps are compared to determine the driving skill of the corresponding driver. In the following explanation, constructions different from the first embodiment are mainly explained.

The driver information acquisition portion 402 acquires the driver information including the driving skill of the driver 302. The aforementioned driving skill corresponds to driving skill of the driver 302 with the vehicle 1. For example, the driving skill serves as information indicating the driving skill of the driver 302, such as whether the driver 302 is a professional driver or a beginner driver, for example.

The generation portion 403 generates a personalized saliency map for each driving skill of the driver 302 based on the captured image acquired by the image acquisition portion 401 and the driver information including driving skill acquired by the driver information acquisition portion 402.

The determination portion 404 determines the driving skill of the driver 302 by comparing the personalized saliency maps for different driving skills and the gaze distribution of the driver 302 detected by the gaze detection portion 400. In the second embodiment, the determination portion 404 determines the driving skill conforming to one of the personalized saliency maps of which difference from the gaze distribution is the smallest as the driving skill of the driver 302.

The driving skill is desirably determined by an actual driving operation of the vehicle 1. The driving skill greatly reflects ability to predict danger at the time of driving of the vehicle 1. The determination of driving skill of the driver 302 using the gaze distribution detected by the gaze detection portion 400 and the personalized saliency map specified for each driving skill allows accurate determination of the driving skill of the driver 302 that is originally uncertain to be specified.

The alert portion 405 changes or adjusts a frequency of alerts based on the determination result of the driving skill of the driver 302. Specifically, the alert portion 405 increases the frequency of alerts in a case where the driving skill of the driver 302 is lower than a predetermined driving skill than the frequency of alerts in a case where the driving skill of the driver 302 is equal to or higher than the predetermined driving skill.

The driver 302 may be annoyed if he/she is frequently alerted (i.e., if driver's attention is frequently drawn). In addition, because of influence of peripheral vision, it may be difficult to determine that the driver 302 fails to look at an object that should be visually confirmed simply on a basis of the gaze distribution (gaze points) detected by the gaze detection portion 400. The alert may be thus wrongly issued.

According to the second embodiment, the alert portion 405 changes the frequency of alerts depending on the determination result of the driving skill of the drier 302. The driver 302 may be restrained from being bothered by the frequent alerts that may occur even though the driver 302 has high driving skill and the frequent alerts are not necessary. In a case where the driving skill of the driver 302 is low so that the driver 302 needs to be actively alerted to danger, safety-sensitive design where the driver 302 is frequently alerted to danger is obtainable.

The alert portion 405 may transmit the determination result of the driving skill of the driver 302 to a computer terminal of an insurance company for the vehicle 1. The insurance company that shares the determination result of the driving skill of the driver 302 may set an optimum automobile insurance premium depending on the driving skill of the driver 302.

An example of determining the driving skill at the vehicle 1 according to the second embodiment is explained with reference to FIG. 6.

Figure 6:
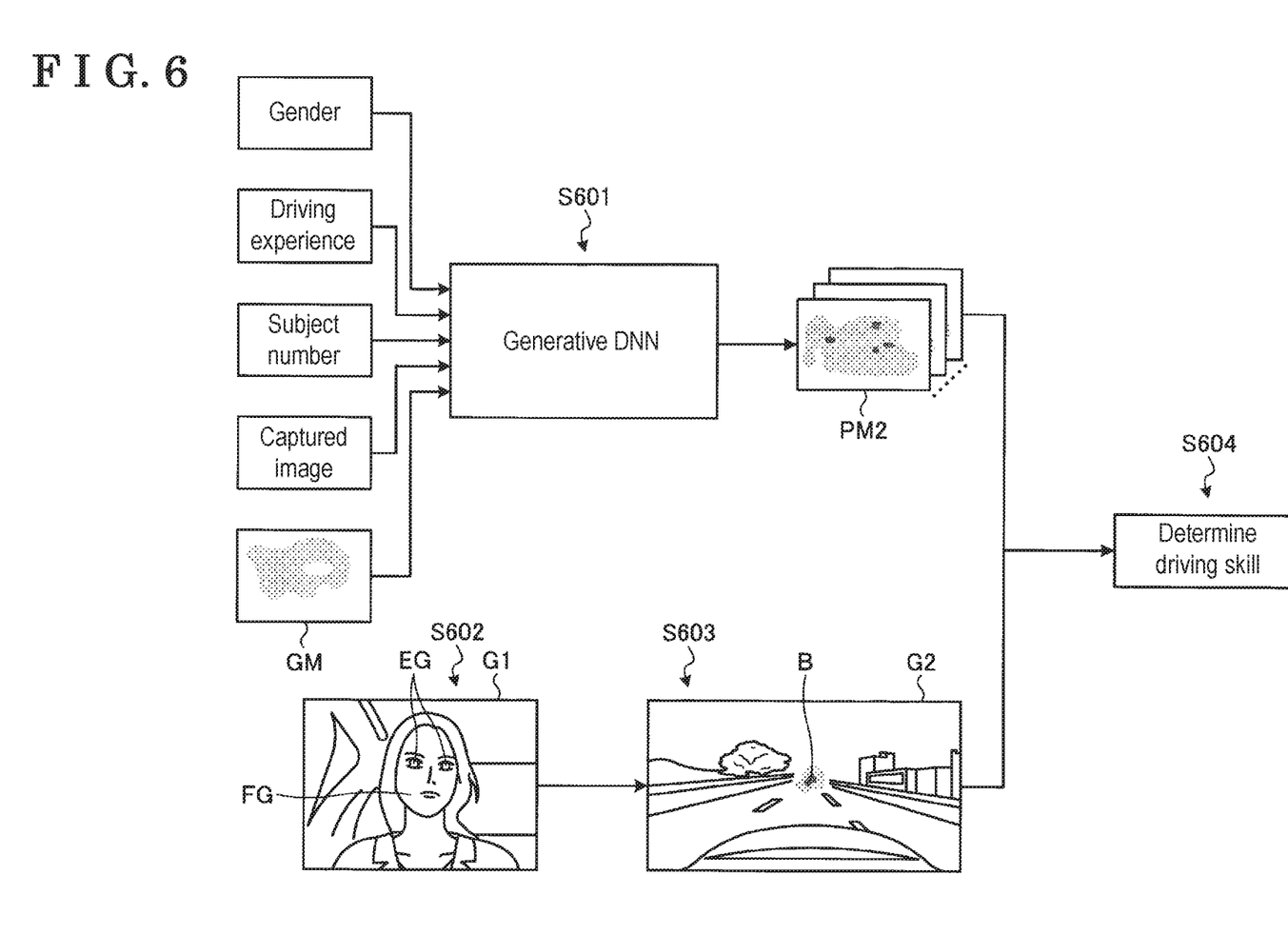
FIG. 6 is a diagram explaining a processing of determining driving skill of a driver at the vehicle according to a second embodiment.

In the second embodiment, as illustrated in FIG. 6, the generation portion 403 learns a generative model that is configured to generate a personalized saliency map PM2 for each different driving skill by a generative deep neural network with inputs of a captured image obtained by the image acquisition portion 401, gender, driving experience, subject number, and the global saliency map GM (step S601).

The gaze detection portion 400 detects a face image FG and an eye image EG of the driver 302 from a captured image G1 obtained by the driver monitoring camera 201 that captures an image of the driver 302 (step S602). The gaze detection portion 400 detects a gaze distribution B of the driver 302 in a captured image G2 (for example, the captured image obtained by the imaging device 15 that captures an image in front of the vehicle 1) obtained by the image acquisition portion 401 based on the detected face image FG and eye image EG as illustrated in FIG. 6 (step S603).

Next, the determination portion 404 compares personalized saliency maps PM2 for the respective driving skills and the gaze distribution B in the captured image G2 as illustrated in FIG. 6. The determination portion 404 then determines the driving skill conforming to one of the personalized saliency maps PM2 having the smallest difference (deviation) from the detected gaze distribution B as the driving skill of the driver 302 (step S604).

According to the second embodiment, the driving skill of the driver 302 is determined by the gaze distribution detected by the gaze detection portion 400 and the personalized saliency maps for the respective driving skills. The driving skill of the driver 302 which is originally uncertain to be specified may be thus determined highly accurately.

A third embodiment is explained below. According to the third embodiment, the frequency of alerts is differentiated between a case where the personalized saliency map for a first driving skill and the gaze distribution of the driver deviate from each other and a case where the personalized saliency map for a second driving skill that is higher than the first driving skill and the gaze distribution of the driver deviate from each other. Explanations for the same constructions as those of the second embodiment are omitted.

The alert portion 405 changes the frequency of alerts between a case where a difference between the personalized saliency map for the driving skill of a beginner driver and the gaze distribution detected by the gaze detection portion 400 is greater than a predetermined threshold value and a case where a difference between the personalized saliency map for the driving skill of a professional driver and the gaze distribution detected by the gaze detection portion 400 is greater than the predetermined threshold value.

In a case where the personalized saliency map for the driver 302 with low driving skill such as a beginner driver, for example, and the gaze distribution detected by the gaze detection portion 400 deviate from each other, the driver 302 is restrained from being bothered by frequent alerts for the object at which only the driver 302 with low driving skill gazes. In addition, in a case where the personalized saliency map for the driver 302 with high driving skill such as a professional driver, for example, and the gaze distribution detected by the gaze detection portion 400 deviate from each other, the driver 302 is frequently alerted to danger because the object that should be looked and confirmed may possibly exist, so that the driver 302 is enhanced to look at the object to confirm it.

In the third embodiment, the frequency of alerts in a case where the difference between the personalized saliency map for the driving skill of a beginner driver, for example (which serves as the first driving skill), and the gaze distribution detected by the gaze detection portion 400 is greater than the predetermined threshold value increases than the frequency of alerts in a case where the difference between the personalized saliency map for the driving skill of a professional driver, for example (which serves as the second driving skill higher than the first driving skill), and the gaze distribution detected by the gaze detection portion 400 is greater than the predetermined threshold value.

An example of alerting a driver to danger at the vehicle 1 according to the third embodiment is explained with reference to FIG. 7.

Figure 7:
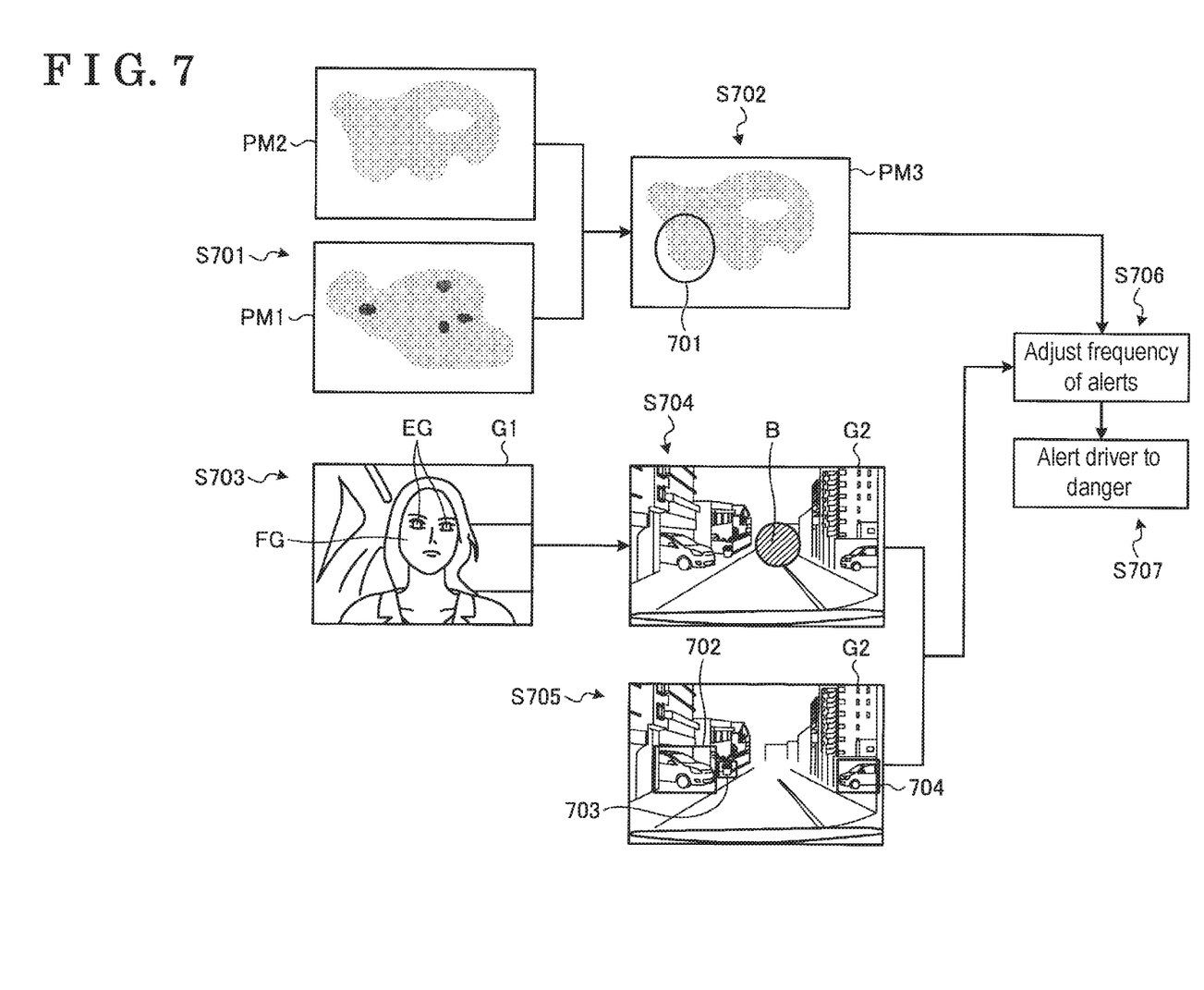
FIG. 7 is a diagram explaining a processing of alerting a driver to danger at the vehicle according to a third embodiment.

In the third embodiment, as illustrated in FIG. 7, the generation portion 403 generates the personalized saliency map PM1 for the driver 302 with the first driving skill and the personalized saliency map PM2 for the driver 302 with the second driving skill by the generative model based on the captured image obtained by the imaging device 15 that captures an image in a travelling direction (for example, a forward direction) of the vehicle 1, the driver information, and the vehicle information (step S701).

The determination portion 404 compares the personalized saliency map PM1 for the driver 302 with the first driving skill and the personalized saliency map PM2 for the driver 302 with the second driving skill to extract a determination range 701 in a personalized saliency map PM3 that is obtained by combining the personalized saliency map PM1 and the personalized saliency map PM2. The determination range 701 includes a difference in saliency greater than a predetermined value between the personalized saliency map PM1 and the personalized saliency map PM2 (step S702).

The gaze detection portion 400 detects the face image FG and the eye image EG of the driver 302 from the captured image G1 obtained by the driver monitoring camera 201 as illustrated in FIG. 7 (step S703). The gaze detection portion 400 then detects the gaze distribution B of the driver 302 in the captured image G2 based on the detected face image FG and eye image EG (step S704).

The gaze detection portion 400 performs an image processing on the captured image G2 to detect positions of respective objects, i.e., positions 702, 703, and 704, included in the captured image G2 as illustrated in FIG. 7 (step S705). The gaze detection portion 400 compares the gaze distribution B of the driver 302 in the captured image G2 and the positions 702, 703, and 704 included in the captured image G2 to extract the position of the object (for example, the position 703) at which the driver 302 looks.

The determination portion 404 determines whether or not the determination range 701 and the extracted position 703 match each other. Depending on such determination result, the alert portion 405 adjusts the frequency of alerts (step S706) and then alerts the driver 302 (step S707). In the example illustrated in FIG. 7, the determination range 701 and the position 703 at which the driver 302 looks fail to match each other. The alert portion 405 thus increases the frequency of alerts than a predetermined frequency of alerts. In a case where the determination range 701 and the position of the object at which the driver 302 looks match each other, the alert portion 405 decreases the frequency of alerts or maintains the predetermined frequency of alerts.

According to the third embodiment, in a case where the personalized saliency map for the driver 302 having low driving skill and the gaze distribution detected by the gaze detection portion 400 deviate from each other, the driver 302 is restrained from being bothered by frequent alerts for the object at which only the driver 302 with low driving skill gazes. In addition, in a case where the personalized saliency map for the driver 302 having high driving skill and the gaze distribution detected by the gaze detection portion 400 deviate from each other, the driver 302 is frequently alerted to danger because the object that should be looked and confirmed may possibly exist, so that the driver 302 is enhanced to look at the object to confirm it.

A fourth embodiment is explained below. According to the fourth embodiment, a bottom-up saliency map is generated on a basis of a captured image, and a top-down saliency map obtained by removing the bottom-up saliency map from a personal saliency map is generated. The frequency of alerts is differentiated between a case where the detected gaze distribution and the bottom-up saliency map deviate from each other and a case where the detected gaze distribution and the top-down saliency map deviate from each other. Explanations for the same constructions as those of the aforementioned embodiments are omitted.

The generation portion 403 generates the bottom-up saliency map that is defined by features of brightness and gradient, for example, of a captured image acquired by the image acquisition portion 401. The generation portion 403 then generates the top-down saliency map serving as a difference between the bottom-up saliency map and the personalized saliency map generated by the generative model based on the captured image acquired by the image acquisition portion 401, the driver information, and the vehicle information.

The top-down saliency map largely reflects humans will, such as confirmation of an advertisement (signboard) in the vicinity of an exit of an expressway, a side road, and someone/something running out into the road. The top-down saliency map includes relatively small features as in the image but indicates saliency at a region that is highly possibly gazed steadily by the driver 302 who sees ahead for safety confirmation, for example.

The alert portion 405 thus differentiates the frequency of alerts between the case where the gaze distribution detected by the gaze detection portion 400 and the bottom-up saliency map deviate from each other and the case where the aforementioned detected gaze distribution and the top-down saliency map deviate from each other. In the fourth embodiment, the alert portion 405 increases the frequency of alerts in the case where the detected gaze distribution and the top-down saliency map deviate from each other than the case where the detected gaze distribution and the bottom-up saliency map deviate from each other.

According to the fourth embodiment, in a case where the bottom-up saliency map and the gaze distribution detected by the gaze detection portion 400 deviate from each other, the driver 302 is inhibited from being bothered by a situation where the driver is frequently alerted even though necessity of steady gazing for safety confirmation is low. In a case where the top-down saliency map and the gaze distribution detected by the gaze detection portion 400 deviate from each other so that steady gazing for safety conformation is necessary for the driver 302, the driver 302 is frequently alerted so as to be informed of a region that should be looked for safety confirmation.

The personalized saliency map reflects a region that is likely to be looked or gazed steadily by the driver 302 while the driver 302 is driving the vehicle 1. The personalized saliency map is thus applicable for optimization of a display position of an advertisement placed in the vicinity of a road where the vehicle 1 is driven. Specifically, according to the fourth embodiment, the generation portion 403 generates the personalized saliency maps for respective attributions of the drivers (for example, the gender of the driver 302). The alert portion 405 transmits the personalized saliency maps generated for the respective attributions to a computer terminal of a maker (trader) that operates the advertisement.

The maker operating such advertisement may thus optimize the display position of the advertisement based on the personalized saliency maps that vary depending on attributions of drivers 302 and the content of the advertisement. For example, an advertisement for women may be placed in a region that is easily looked by a woman driver. With development of automated driving of a vehicle, a movement or operation of the driver 302 within a vehicle interior 2a may change. A vehicle may be a medium of service relative to outside the vehicle as called Mobility as a Service (MaaS). In such circumstances, information desired by the driver 302 or a passenger of the vehicle 1 and services outside the vehicle may possibly match each other by connecting such desired information and contents of advertisements outside the vehicle.

According to the aforementioned embodiments, a driving assistance apparatus includes a gaze detection portion 400 detecting a gaze distribution of a driver 302 for a vehicle 1, an image acquisition portion 401 acquiring a captured image from an imaging device 15 that captures an image in surroundings of the vehicle 1, a driver information acquisition portion 402 acquiring driver information that allows identification of the driver 302 for the vehicle 1, a generation portion 403 generating a personalized saliency map based on the captured image and the driver information, the personalized saliency map that serves as a saliency map for the captured image and that differs depending on the driver 302, and a determination portion 404 determining whether or not the driver 302 looks at a visual confirmation target in the surroundings of the vehicle 1 by comparing the gaze distribution detected by the gaze detection portion 400 and the personalized saliency map generated by the generation portion 403.

Accordingly, accuracy of determining whether or not the driver 302 recognizes danger in the surroundings of the vehicle 1 may improve.

In addition, the generation portion 403 learns a generative model by a generative deep neural network, the generative model being configured to generate the personalized saliency map based on the captured image and the driver information. The generation portion 403 generates the personalized saliency map by the generative model.

Accordingly, a submodule dedicated to each driver 302 is thus not required and the personalized saliency map for each different driver (each driver 302) may be generated at the vehicle 1.

The driving assistance apparatus further includes an alert portion 405 alerting the driver 302 to danger in a case where it is determined that the driver 302 fails to look at the visual confirmation target.

Accordingly, the driver 302 of the vehicle 1 may easily recognize that he/she fails to look at a subject that should be visually confirmed (the visual confirmation target) in the surroundings of the vehicle 1.

According to the second embodiment, the driver information acquisition portion 402 acquires the driver information including driving skill of the driver 302. The generation portion 403 generates the personalized saliency map that differs depending on the driving skill of the driver 302 based on the captured image and the driver information. The determination portion 404 determines the driving skill of the driver 302 based on the gaze distribution detected by the gaze detection portion 400 and the personalized saliency map generated by the generation portion 403.

The driving skill of the driver 302 which is originally uncertain to be specified may be thus determined highly accurately.

In addition, the alert portion 405 changes a frequency of alerts based on a determination result of the driving skill of the driver 302 determined by the determination portion 404.

The driver 302 may be restrained from being bothered by frequent alerts that may occur even though the driver 302 has high driving skill and the frequent alerts are not necessary. In a case where the driving skill of the driver 302 is low so that the driver 302 needs to be actively alerted to danger, safety-sensitive design where the driver 302 is frequently alerted to danger is obtainable.

According to the third embodiment, the alert portion 405 differentiates the frequency of alerts between a case where the personalized saliency map for a first driving skill and the gaze distribution detected by the gaze detection portion 400 deviate from each other and a case where the personalized saliency map for a second driving skill higher than the first driving skill and the gaze distribution detected by the gaze detection portion 400 deviate from each other.

In a case where the personalized saliency map for the driver 302 having low driving skill and the gaze distribution detected by the gaze detection portion 400 deviate from each other, the driver 302 may be restrained from being bothered by frequent alerts for the subject at which only the driver 302 with low driving skill gazes. In addition, in a case where the personalized saliency map for the driver 302 having high driving skill and the gaze distribution detected by the gaze detection portion 400 deviate from each other, the driver 302 is frequently alerted to danger because the subject that should be looked and confirmed may possibly exist, so that the driver 302 is enhanced to gaze at the subject to confirm it.

According to the fourth embodiment, the generation portion 403 generates a bottom-up saliency map based on the captured image and generates a top-down saliency map by removing the bottom-up saliency map from the personalized saliency map, the generation portion 403 differentiating the frequency of alerts between a case where the gaze distribution detected by the gaze detection portion and the bottom-up saliency map deviate from each other and a case where the gaze distribution detected by the gaze detection portion and the top-down saliency map deviate from each other.

In a case where the bottom-up saliency map and the gaze distribution detected by the gaze detection portion 400 deviate from each other, the driver 302 is inhibited from being bothered by a situation where the driver is frequently alerted to danger even though necessity of steady gazing for safety confirmation is low. In a case where the top-down saliency map and the gaze distribution detected by the gaze detection portion 400 deviate from each other so that steady gazing for safety conformation is necessary for the driver 302, the driver 302 is frequently alerted to danger so as to be informed of a region that should be looked for safety confirmation.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A driving assistance apparatus comprising:
   at least one processor configured to implement:
   a gaze detection portion detecting a gaze distribution of a driver for a vehicle;
   an image acquisition portion acquiring a captured image from an imaging device that captures an image in surroundings of the vehicle;
   a driver information acquisition portion acquiring driver information that allows identification of the a driver from a plurality of potential drivers for the vehicle;
   a generation portion generating a personalized saliency map based on the captured image and the driver information for each of the plurality of drivers, the personalized saliency map serves as a saliency map for the captured image and that differs for each driver of the plurality of drivers; and
   a determination portion determining whether or not the driver looks at a visual confirmation target in the surroundings of the vehicle by comparing the gaze distribution detected by the gaze detection portion and the personalized saliency map generated by the generation portion for the driver.

2. The driving assistance apparatus according to claim 1, wherein the generation portion learns a generative model by a generative deep neural network, the generative model being configured to generate the personalized saliency map based on the captured image and the driver information,
   the generation portion generates the personalized saliency map by the generative model.

3. The driving assistance apparatus according to claim 1, further comprising an alert portion alerting the driver to danger in a case where it is determined that the driver fails to look at the visual confirmation target.

4. The driving assistance apparatus according to claim 3, wherein the driver information acquisition portion acquires the driver information including driving skill of the driver,
   the generation portion generates the personalized saliency map that differs depending on the driving skill of the driver based on the captured image and the driver information, and
   the determination portion determines the driving skill of the driver based on the gaze distribution detected by the gaze detection portion and the personalized saliency map generated by the generation portion for the driver.

5. The driving assistance apparatus according to claim 4, wherein the alert portion changes a frequency of alerts based on a determination result of the driving skill of the driver determined by the determination portion.

6. The driving assistance apparatus according to claim 4, wherein the alert portion differentiates the frequency of alerts between a case where the personalized saliency map for a first driving skill and the gaze distribution detected by the gaze detection portion deviate from each other and a case where the personalized saliency map for a second driving skill higher than the first driving skill and the gaze distribution detected by the gaze detection portion deviate from each other.

7. The driving assistance apparatus according to claim 5, wherein the alert portion differentiates the frequency of alerts between a case where the personalized saliency map for a first driving skill and the gaze distribution detected by the gaze detection portion deviate from each other and a case where the personalized saliency map for a second driving skill higher than the first driving skill and the gaze distribution detected by the gaze detection portion deviate from each other.

8. The driving assistance apparatus according to claim 3, wherein the generation portion generates a bottom-up saliency map based on the captured image and generates a top-down saliency map by removing the bottom-up saliency map from the personalized saliency map, the generation portion differentiating the frequency of alerts between a case where the gaze distribution detected by the gaze detection portion and the bottom-up saliency map deviate from each other and a case where the gaze distribution detected by the gaze detection portion and the top-down saliency map deviate from each other.

9. The driving assistance apparatus according to claim 4, wherein the generation portion generates a bottom-up saliency map based on the captured image and generates a top-down saliency map by removing the bottom-up saliency map from the personalized saliency map, the generation portion differentiating the frequency of alerts between a case where the gaze distribution detected by the gaze detection portion and the bottom-up saliency map deviate from each other and a case where the gaze distribution detected by the gaze detection portion and the top-down saliency map deviate from each other.

10. The driving assistance apparatus according to claim 5, wherein the generation portion generates a bottom-up saliency map based on the captured image and generates a top-down saliency map by removing the bottom-up saliency map from the personalized saliency map, the generation portion differentiating the frequency of alerts between a case where the gaze distribution detected by the gaze detection portion and the bottom-up saliency map deviate from each other and a case where the gaze distribution detected by the gaze detection portion and the top-down saliency map deviate from each other.

11. The driving assistance apparatus according to claim 6, wherein the generation portion generates a bottom-up saliency map based on the captured image and generates a top-down saliency map by removing the bottom-up saliency map from the personalized saliency map, the generation portion differentiating the frequency of alerts between a case where the gaze distribution detected by the gaze detection portion and the bottom-up saliency map deviate from each other and a case where the gaze distribution detected by the gaze detection portion and the top-down saliency map deviate from each other.

12. The driving assistance apparatus according to claim 7, wherein the generation portion generates a bottom-up saliency map based on the captured image and generates a top-down saliency map by removing the bottom-up saliency map from the personalized saliency map, the generation portion differentiating the frequency of alerts between a case where the gaze distribution detected by the gaze detection portion and the bottom-up saliency map deviate from each other and a case where the gaze distribution detected by the gaze detection portion and the top-down saliency map deviate from each other.

\* \* \* \* \*